UNITED STATES PATENT OFFICE.

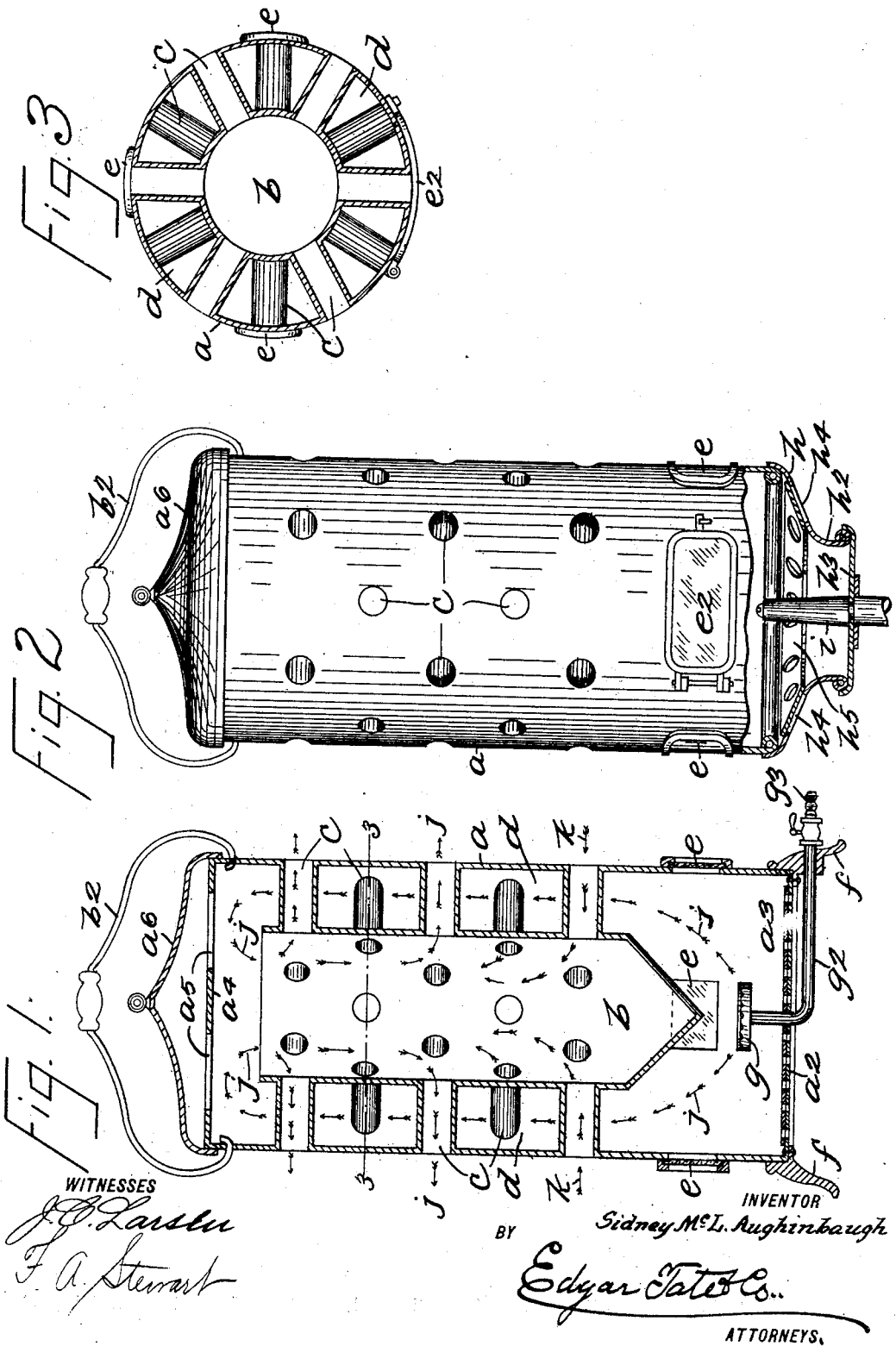

SIDNEY McL. AUGHINBAUGH, OF CHAMBERSBURG, PENNSYLVANIA.

HEATER.

No. 797,339.        Specification of Letters Patent.        Patented Aug. 15, 1905.

Application filed October 31, 1904. Serial No. 230,664.

*To all whom it may concern:*

Be it known that I, SIDNEY MCL. AUGHINBAUGH, a citizen of the United States, residing at Chambersburg, in the county of Franklin and State of Pennsylvania, have invented certain new and useful Improvements in Heaters, of which the following is a specification, such as will enable those skilled in the art to which it appertains to make and use the same.

This invention relates to heaters of the class known as "heating-drums;" and the object thereof is to provide an improved device of this class which may be used independently as a stove or which may be applied to a gas or other burner as a heating-drum; and with this and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a central vertical section of my improved heater made in the form of a stove and adapted to be placed on the floor or any suitable support; Fig. 2, a side view, partially in section and showing a modification of my improved heater adapted for use in connection with a gas or other burner; and Fig. 3, a section on the line 3 3 of Fig. 1.

In the practice of my invention I provide a drum or casing $a$, which is preferably circular in cross-section and within which is concentrically placed a supplemental casing $b$, open at the top and closed at the bottom, and the vertical height of the supplemental casing $b$ is less than that of the outer drum or casing $a$, and the lower end thereof is preferably conical or tapered in form, as clearly shown in Fig. 1.

In the form of construction shown in Fig. 1 the drum or casing $a$ is provided with a perforated bottom-plate $a^2$, over which is placed a perforated register-plate $a^3$, whereby air may be admitted to the bottom of the main drum or casing and any suitable means may be provided for operating the register-plate $a^3$. The upper end of the main outer drum or casing $a$ is closed by a top-plate $a^4$, having openings $a^5$, and said main drum or casing is also provided with a removable cover or top $a^6$ and with a bail $b^2$.

The main outer drum or casing $a$ is provided with radially-arranged tubes $c$, which are arranged in the form of construction shown, in separate horizontal planes and which pass through the annular space $d$ between the main outer drum or casing and into the supplemental inner casing $b$, and the bottom portion of the drum or casing $a$ is provided with a plurality of transparent panels $e$, one of which is made in the form of a door, as shown at $e^2$ in Fig. 1, and by means thereof a burner located in the bottom of the drum or main outer casing $a$ may be ignited.

In the form of construction shown in Fig. 1 the drum or casing $a$ is provided with legs $f$, and located in the bottom thereof is a gas-burner $g$, with which is connected a gas-supply pipe $g^2$, which passes out through the bottom of the drum or casing $a$ and is provided with a nozzle end piece $g^3$, with which a flexible gas-supply tube may be connected.

In the form of construction shown in Fig. 2 the main outer drum or casing $a$ is provided with an annular contracted bottom $h$, formed into a neck $h^2$, with which is connected a bottom plate $h^3$, having a central opening, and this form of heater is adapted to be mounted on an ordinary gas-burner top or tube $i$, and the annular bottom member $h$ is provided with air-openings $h^4$, over which is placed a register-plate $h^5$, having similar holes or openings, and any suitable means may be provided for turning the register-plate $h^5$.

In practice, reference being made to Fig. 1, the gas from the burner $g$ is ignited and the products of combustion pass upwardly around the supplemental inner casing $b$, as indicated by the arrows $j$, and down into the said supplemental inner casing $b$ and out through the upper horizontal tubes $c$, as indicated by said arrows, and at the same time outside air enters through the lower horizontal tube $c$, as indicated by the arrows $k$, and this air also passes into the inner casing $b$ and out through the upper horizontal tubes $c$. In this operation air also passes inwardly through the bottom plate $a^2$, and the amount of air entering through said bottom plate may be regulated by the register-plate $a^3$, and this air mingles with the hot products of combustion and follows the course indicated by the arrows $j$, and in this way the air of a room or compartment may be quickly and easily heated to the desired extent.

The construction shown in Fig. 2 is similar in all respects to that shown in Fig. 1, saving and excepting the bottom portion thereof, (indicated by the parts $h$ and $h^3$,) and the operation will be similar to that of the construction shown in Fig. 1.

My invention is not limited in any way to the kind or class of burner employed; but an ordinary coal-oil burner may be employed in place of the burner $g$, (shown in Fig. 1,) and my improved heater may also be applied to an ordinary lamp.

Whenever desired, the cover $a^6$ may be removed and a vessel containing water or other material may be placed on the top plate $a^4$ of the drum or casing $a$ and the contents thereof heated, and various changes in and modifications of the construction described may be made without departing from the spirit of my invention or sacrificing its advantages.

Having fully described my invention, what I claim as new, and desire to secure by Letters Patent, is—

1. A heater of the class described, comprising a vertically-arranged main outer drum or casing, a supplemental inner drum or casing placed vertically and concentrically therein, and shorter than the main outer drum or casing and being closed at the bottom and open at the top, and being connected with the main outer drum or casing by tubes which communicate therewith from the top to the bottom portion thereof and which form a communication between the outer air and the interior of the supplemental inner drum or casing, the main outer drum or casing being also provided with a top plate having holes or openings and a removable closed cover; substantially as shown and described.

2. A heater of the class described, comprising a main outer drum or casing, a supplemental drum or casing placed concentrically therein and open at the top and closed at the bottom, the supplemental drum or casing being shorter at both ends than the main outer casing, and said main outer casing being provided at the top thereof with a closed cover, the said main outer casing and the supplemental casing being also connected by tubes arranged laterally therein at the top and bottom thereof and which communicate with the outer air and with the interior of the supplemental casing, substantially as shown and described.

3. A heater of the class described, comprising a vertically-arranged main outer drum or casing, a supplemental inner casing placed concentrically therein and shorter at the top and bottom than the main outer drum or casing, said supplemental inner casing being open at the top and closed at the bottom and the main outer casing being provided with a closed cover, said main outer casing and the supplemental inner casing being also connected by laterally-arranged tubes which form a communication between the outer air and the interior of the supplemental inner casing at the top and bottom thereof, substantially as shown and described.

4. A heater of the class described, comprising a vertically-arranged main outer drum or casing, a supplemental inner casing placed concentrically therein and shorter at the top and bottom than the main outer drum or casing, said supplemental inner casing being open at the top and closed at the bottom and the main outer casing being provided with a closed cover, said main outer casing and the supplemental inner casing being also connected by laterally-arranged tubes which form a communication between the outer air and the interior of the supplemental inner casing at the top and bottom thereof, and said main outer casing being also provided at the top thereof and below the cover with a plate having holes or openings, substantially as shown and described.

In testimony that I claim the foregoing as my invention I have signed my name in presence of the subscribing witnesses.

SIDNEY McL. AUGHINBAUGH.

Witnesses:
F. A. STEWART,
C. J. KLEIN.